United States Patent Office 3,484,235
Patented Dec. 16, 1969

3,484,235
RECOVERY OF PALLADIUM AND/OR PALLADIUM SALTS
Harry F. Goss, Longview, Tex., and Ronald A. De Jean, Spur Tree, Jamaica, British West Indies, assignors to Eastman Kodak Company, Rochester, N.Y., a corporation of New Jersey
No Drawing. Filed Dec. 26, 1967, Ser. No. 693,073
Int. Cl. C22b *11/04*
U.S. Cl. 75—121     6 Claims

ABSTRACT OF THE DISCLOSURE

This invention is concerned with the recovery of palladium and/or palladium salts from solutions thereof, such as from catalyst solution, by the formation of an insoluble palladium complex. The palladium is thereafter recovered from the complex.

---

This invention is concerned with the recovery of palladium from solutions containing palladium salts.

Catalyst solutions containing palladium and copper salts are widely used in olefin oxidation plants. Liquid streams discarded from these plants include water flashed over with the product, side streams discarded for removal of undesirable material built up in the catalyst, and total removal of the catalyst in case of poisoning. It is advantageous to remove the palladium from these streams in order to hold the process cost to a minimum.

A review of the literature reveals that several methods for recovering palladium from solutions are known. Palladium metal may be plated out of a palladium salt solution by the action of a reducing agent such as hydrogen and ethylene, or it may also be precipitated by the use of alcohols, formaldehyde and hydroxylamine hydrochloride. Palladium will precipitate from a basic solution.

Many problems are encountered in each of these processes. The presence of acids and copper salts interferes with most recovery processes. In most cases, the agent used to remove the palladium may not be recovered. Precipitated palladium metal is difficult to recover because it adheres very strongly to any available surface. After the palladium metal is recovered, it must be restored to the desired salt by an expensive and time-consuming process.

It is an object of this invention to provide a process for the recovery of palladium from solutions containing palladium salts.

Another object is to provide a process for the recovery of palladium from catalyst solution containing palladium by formation and precipitation of an insoluble palladium complex.

These and other objects are attained by the practice of this invention which, briefly, comprises contacting a liquid stream containing the palladium salt with a compound which forms a solid insoluble complex with the palladium salt, precipitating the resultant insoluble palladium complex, collecting the precipitate by filtration, decantation or other means, heating the precipitated solid to remove the complexing agent and recovering the palladium salt of palladium metal.

The process for recovering palladium from liquid streams containing palladium salts is more specifically described below.

The process comprises introducing a solution containing a palladium salt into a vessel, adding to the vessel an olefin containing two or more double bonds and allowing the mixture to stand for several hours at room temperature until a precipitate is formed. The solid precipitate is then recovered by filtration and/or decantation and charged to a vessel such as a flask equipped with a condenser for trapping condensable vapors in the discharge gas. The flask is heated to decompose the complex and the palladium salt such as palladium chloride is recovered as the highly pure salt. The olefin complexing agent is condensed in the condenser and recovered.

Palladium salts which may be contained in the liquid stream include organic carboxylic acid salts and inorganic acid salts of palladium, chloropalladous acid and the metal salts of chloropalladous acid. Examples of the organic carboxylic acid salts of palladium are compounds which have the formula $Pd(OCOR)_2$ where R is alkyl, aryl, aralkyl, or cycloaliphatic such as palladium acetate, palladium propionate, palladium isobutyrate, palladium butyrate, palladium 2-ethyl-hexanoate, palladium naphthenate, etc. Palladium dichloride is the preferred inorganic acid salt of palladium. The metal chloropalladites which are useful in the process of the invention have the formulas $M_x[PdCl_4]_y$, wherein M is an alkali metal or a multivalent metal such as calcium, iron, molybdenum, nickel, cobalt, manganese, vanadium, tungsten or chrominum; X is 1 or 2 and y is 1 or 3 and is defined by the formula $y = X(V/2)$ wherein V is the valence of the metal, and $M_2PdCl_4$, wherein M is sodium, lithium, potassium, rubidium or cesium.

The concentration of the palladium salt in the liquid stream may vary widely. Also the liquid stream may contain salts of other metals such as cupric chloride, cuprous chloride, etc.

The complexing agent which preferably is an olefin containing two or more double bonds includes 1,5-cyclooctadiene, tetramethyl butadiene, isoprene, 1,3-cyclooctadiene, 1,5,9-cyclododecatriene, etc. The olefin which may be used in the process must form an insoluble complex with the palladium salt and it should vaporize at a temperature below the melting point of palladium.

The practice of this invention is illustrated by the following examples.

EXAMPLE 1

A solution containing 0.006 mole per liter of palladium chloride is charged to a glass-lined vessel. Other materials present in this aqueous solution are acetic acid, hydrochloric acid, and dissolved cupric chloride and cuprous chloride salts. An addition of 1.5 mole of 1,5-cyclooctadiene for each mole of palladium salt is made. The solution is allowed to stand for one hour at room temperature. The solid is then recovered by filtration and charged to a flask equipped with a condenser for trapping condensable vapors in the discharge gas. The flask is heated and 58 percent of the 1,5-cyclooctadine is recovered. Ninety-two percent of the palladium chloride is recovered as the highly pure salt.

EXAMPLE 2

To an anhydrous acetic acid solution containing 0.01 mole per liter of palladium chloride, 0.5 mole per liter of cupric chloride, and 0.2 mole per liter of lithium acetate, 0.01 mole per liter of cyclopentadiene was added. The solution was allowed to stand at room temperature and the precipitate formed was recovered and heated until all organics were driven off. Ninety percent of the palladium present was recovered.

The invention has been described in considerable detail with particular reference to certain preferred embodiments thereof, but it will be understood that variations and modifications can be effected within the spirit and scope of the invention as described hereinbefore and as defined in the appended claims.

We claim:
1. A process for recovering palladium from liquid streams which contain palladium salts selected from the class consisting of organic carboxylic acid salts of palladium, inorganic acid salts of palladium, chloropalladous acid or metal salts of chloropalladous acid; wherein the improvement comprises contacting said palladium salts with an olefinically unsaturated compound containing two or more double bonds which forms a solid insoluble palladium complex, recovering the said solid complex as a precipitate, decomposing the palladium complex and recovering palladium metal or original palladium salt.

2. The process according to claim 1 wherein the olefinically unsaturated compound, which forms a solid insoluble complex with palladium, is selected from the group consisting of 1,5-cyclooctadiene, tetramethyl butadiene, isoprene, 1,3-cyclooctadiene and 1,5,9-cyclododecatriene.

3. The process according to claim 1 wherein the olefinically unsaturated compound is 1,5-cyclooctadiene.

4. The process according to claim 1 wherein the palladium salt is selected from the group consisting of
 (a) chloropalladous acid and its metal salts,
 (b) organic carboxylic acid salts of palladium and
 (c) palladium chloride.

5. The process according to claim 1 wherein the solid insoluble palladium complex precipitate is recovered by filtration or decantation.

6. The process according to claim 1 wherein the palladium metal or palladium salt is recovered from the solid insoluble palladium complex precipitate by heating said precipitate.

References Cited

FOREIGN PATENTS 1,036,538   8/1958   Germany.

OSCAR R. VERTIZ, Primary Examiner

H. S. MILLER, Assistant Examiner

U.S. Cl. X.R.

23—87; 260—429